US012694259B2

(12) United States Patent
Elkhatib et al.

(10) Patent No.: US 12,694,259 B2
(45) Date of Patent: Jul. 28, 2026

(54) LOW POWER MULTI-STAGE SELECTABLE NEURAL NETWORK SUPPRESSION

(71) Applicant: Aondevices, Inc., Irvine, CA (US)

(72) Inventors: Mouna Elkhatib, Irvine, CA (US); Adil Benyassine, Irvine, CA (US); Aruna Vittal, Irvine, CA (US); Daniel Schoch, Irvine, CA (US); Eli Uc, Irvine, CA (US)

(73) Assignee: Aondevices, Inc., Irvine, CA (US)

( * ) Notice: Subject to any disclaimer, the term of this patent is extended or adjusted under 35 U.S.C. 154(b) by 1170 days.

(21) Appl. No.: 17/448,345

(22) Filed: Sep. 21, 2021

(65) Prior Publication Data

US 2022/0092389 A1     Mar. 24, 2022

Related U.S. Application Data

(60) Provisional application No. 63/081,063, filed on Sep. 21, 2020.

(51) Int. Cl.
*G06N 3/02*        (2006.01)
*G06N 3/04*        (2023.01)

(52) U.S. Cl.
CPC ..................................... *G06N 3/04* (2013.01)

(58) Field of Classification Search
CPC ............ G06N 3/04; G06N 3/02; G06N 3/045; G10K 2210/3038; G10K 2210/3222; G10L 21/0208; H04R 1/1083; G06F 2119/10
See application file for complete search history.

(56) References Cited

U.S. PATENT DOCUMENTS

| | | | | |
|---|---|---|---|---|
| 9,343,056 | B1* | 5/2016 | Goodwin | G10K 11/002 |
| 10,497,353 | B2* | 12/2019 | Kulavik | G10K 11/17885 |
| 11,189,261 | B1* | 11/2021 | Lu | G10K 11/17881 |
| 11,899,519 | B2* | 2/2024 | D'Amato | H04R 3/005 |
| 2004/0131194 | A1* | 7/2004 | Gruhle | H04R 29/001 |
| | | | | 381/59 |
| 2011/0300806 | A1* | 12/2011 | Lindahl | G10L 21/0208 |
| | | | | 455/63.1 |
| 2013/0022223 | A1* | 1/2013 | Kehtarnavaz | A61N 1/0541 |
| | | | | 381/317 |
| 2014/0301557 | A1* | 10/2014 | Milligan | A63F 13/25 |
| | | | | 381/71.1 |

(Continued)

FOREIGN PATENT DOCUMENTS

| | | | | |
|---|---|---|---|---|
| WO | WO-2019056301 A1 * | 3/2019 | | H04R 1/10 |

*Primary Examiner* — Grace Park
(74) *Attorney, Agent, or Firm* — Stetina Garred Brucker & Newboles

(57) ABSTRACT

A multi-stage selectable neural network noise suppression system has a first stage noise pattern selection neural network receptive to an input signal. An automatic noise classification is generated based upon an evaluation of the input signal. A noise suppression weight table stores one or more sets of automatic noise suppression weight values corresponding to the generated automatic noise classifications. A second stage noise pattern suppression neural network then selectively applies a specific automatic targeted noise suppression based upon the automatic noise suppression weight values. This approach balances performance quality and power/memory usage that efficiently tailors noise detection and suppression.

20 Claims, 5 Drawing Sheets

(56)  References Cited

U.S. PATENT DOCUMENTS

| | | | |
|---|---|---|---|
| 2016/0004499 A1* | 1/2016 | Kim | H04R 29/008 |
| | | | 715/716 |
| 2018/0211646 A1* | 7/2018 | Kumar | F02D 41/021 |
| 2019/0114742 A1* | 4/2019 | Wang | G06T 5/60 |
| 2019/0286953 A1* | 9/2019 | Farhadi | G06N 3/0495 |
| 2020/0104701 A1* | 4/2020 | Lee | G06N 3/0495 |
| 2020/0194032 A1* | 6/2020 | Basye | G10L 25/87 |
| 2020/0341109 A1* | 10/2020 | Meissner | G01S 13/02 |
| 2021/0264938 A1* | 8/2021 | Yao | G06N 3/08 |
| 2021/0266655 A1* | 8/2021 | Patel | H04R 1/1041 |
| 2021/0345970 A1* | 11/2021 | El-Baz | G06N 3/045 |

* cited by examiner

LOW POWER MULTI-STAGE SELECTABLE NEURAL NETWORK SUPPRESSION

CROSS-REFERENCE TO RELATED APPLICATIONS

This application relates to and claims the benefit of U.S. Provisional Application No. 63/081,063, filed Sep. 21, 2020 and entitled "METHOD FOR LOW POWER MULTI-STAGE SELECTABLE NEURAL NETWORK SUPPRES-SION (MSS-NSS)", the disclosure of which is wholly incorporated by reference in its entirety herein.

STATEMENT RE: FEDERALLY SPONSORED RESEARCH/DEVELOPMENT

Not Applicable

BACKGROUND

1. Technical Field

The present disclosure is directed to speech recognition and machine learning, and more specifically to a deep learning solution to achieve quality audio signals with reduced and/or suppressed noise and other undesirable signal components for speech processing systems.

2. Related Art

In any communication system, signals of interest may be corrupted by ambient noises and other undesirable disturbing signals, all of which may be referred to generally as noise that constitute signal components other than the signal(s) of interest. Noisy environments tend to lower the fidelity of the signal, thus rendering the signal(s) of interest difficult to understand and recognize. Accordingly, noise suppression is a critical process in a multitude of different systems, including audio and ultra-sound systems. A common and prevalent method used to reduce background noise is spectral subtraction. Spectral subtraction employs two spectrum estimates: one estimate of the speech signal disturbed by a background noise signal spectrum, and an estimate of the background noise signal spectrum. These are combined to form an SNR-based (Signal to Noise Ratio) gain function in order to reduce the background noise.

Speech audio, whether processed in the context of speech recognition systems or for aiding listening by those with hearing difficulties, may be enhanced with noise suppression and/or reduction. The recognition success rate may be increased, and listening fatigue in noisy environments may be reduced.

Traditional discrete time signal processing (DSP)-based speech audio enhancements for noise suppression/reduction tends to degrade the signal, especially in harsh operating conditions such as in the presence of non-stationary noises or at very low signal-to-noise ratios.

More recently, artificial intelligence (AI)-based neural network architectures utilizing deep learning methods have shown promising results in noise suppression/reduction performance across a variety of challenging environmental conditions. However, such architectures like convolutional neural networks (CNN) require a large neural network to achieve acceptable performance levels across a range of noisy environments. Thus, such neural networks and corresponding noise suppression/reduction modalities are unsuitable for low power and/or low memory devices.

BRIEF SUMMARY

The embodiments of the present disclosure contemplate methods and system for noise reduction and suppression for low power and/or low memory devices. A small architecture specifically configured to address the competing requirements of good noise suppression and performance across many challenging conditions while low power and memory usage is contemplated.

According to one embodiment, a multi-stage selectable neural network noise suppression system may include a first stage noise pattern selection neural network that is receptive to an input signal. An automatic noise classification may be generated based upon an evaluation of the input signal by the first stage noise pattern selection neural network. The system may also include a noise suppression weight table, which stores one or more sets of automatic noise suppression weight values corresponding to the automatic noise classifications generated by the first stage noise pattern selection neural network. The system may include a second stage noise pattern suppression neural network that is receptive to the input signal. A specific automatic targeted noise suppression may be selectively applied to the input signal based upon the automatic noise suppression weight values provided to the second stage noise pattern suppression neural network from the noise suppression weight table.

The system may further include a manual noise suppression pattern selector that is receptive to an external input of a selection of one of multiple predefined noise classifications, each with manual noise suppression weight values. The second stage noise pattern suppression neural network may selectively apply a manual targeted noise suppression based upon the manual noise suppression weight values associated with the selected one of the predefined noise classifications.

The second stage noise pattern suppression neural network may further apply the automatic targeted noise suppression as a supplement to the application of the manual targeted noise suppression. The automatic noise suppression weight values corresponding to the automatic noise classification generated by the first stage noise pattern selection neural network may be combined with the manual noise suppression weight values associated with the selected one of the predefined noise classifications.

Another embodiment of the present disclosure may be a method for suppressing noise in a signal. The method may begin with receiving an input signal from a signal source, followed by evaluating the input signal with a first stage noise pattern selection neural network. An automatic noise classification may be generated from the evaluation of the input signal. There may also be a step of retrieving, from a noise suppression weight table, a set of automatic noise suppression weight values that are correlated to the automatic noise classification generated by the first stage noise pattern selection neural network. The method may further include selectively applying an automatic targeted noise suppression to the input signal with a second stage noise pattern suppression neural network. The automatic targeted noise suppression may be based upon the retrieved set of automatic noise suppression weight values.

The method may further include a step of receiving an external input of a selection of one of multiple predefined noise classifications. Each of the predefined noise classifications may have a set of manual noise suppression weight values. According to one embodiment, the method may include selectively applying either the automatic targeted noise suppression to the input signal or a manual targeted noise suppression based upon the manual noise suppression weight values that correspond to the selected one of the predefined noise classifications. Alternatively, the method may proceed with combining the selected set of automatic noise suppression weight values and the manual noise suppression weight values into a set of combined noise suppression weight values. Then, there may be a step of applying a combined targeted noise suppression to the input signal based upon the set of combined noise suppression weight values.

Another embodiment is directed to a non-transitory computer readable medium that includes instructions executable by a data processing device to perform a method for suppressing noise in a signal.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a low power, multi-stage selectable neural network suppression systems and methods. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The systems and methods of the present disclosure will be described in the context of speech/voice or the like audio processing applications. It is to be understood, however, that the embodiments of the present disclosure may be adapted to any other system in which noise suppression or reduction will be beneficial. Such systems may include ultrasound systems, infrasound systems, wireless communications systems that utilize radio frequency (RF) signals, wired communications systems in which electrical signaling modalities are used, image recognition applications, pattern recognition applications, and so on.

As utilized herein, noise refers to any extraneous components of a signal other than the desired signal of interest that may become corrupted as a consequence of such extraneous components. This may include ambient noise, as well as any other undesirable disturbing signal. In the context of a speech recognition system operating outdoors, the background sounds of moving automobiles, blowing wind, barking dogs, or operating heavy equipment such as lawnmowers or jackhammers may constitute noise. When operating in an indoor office environment, the hum of air conditioning, background conversations, and clacking keyboards may constitute noise. These noisy environments are understood to lower the fidelity of the signal of interest, rendering them difficult to process and recognize its underlying content. The embodiments of the present disclosure therefore contemplate the suppression and/or reduction of noise. The terms suppression and reduction may be used interchangeably herein, and refers generally to the attenuation of noise, whether that be lowering the noise below perceptible levels, or to reduce the noise to where recognition errors can be minimized to acceptable thresholds.

Figure 1:
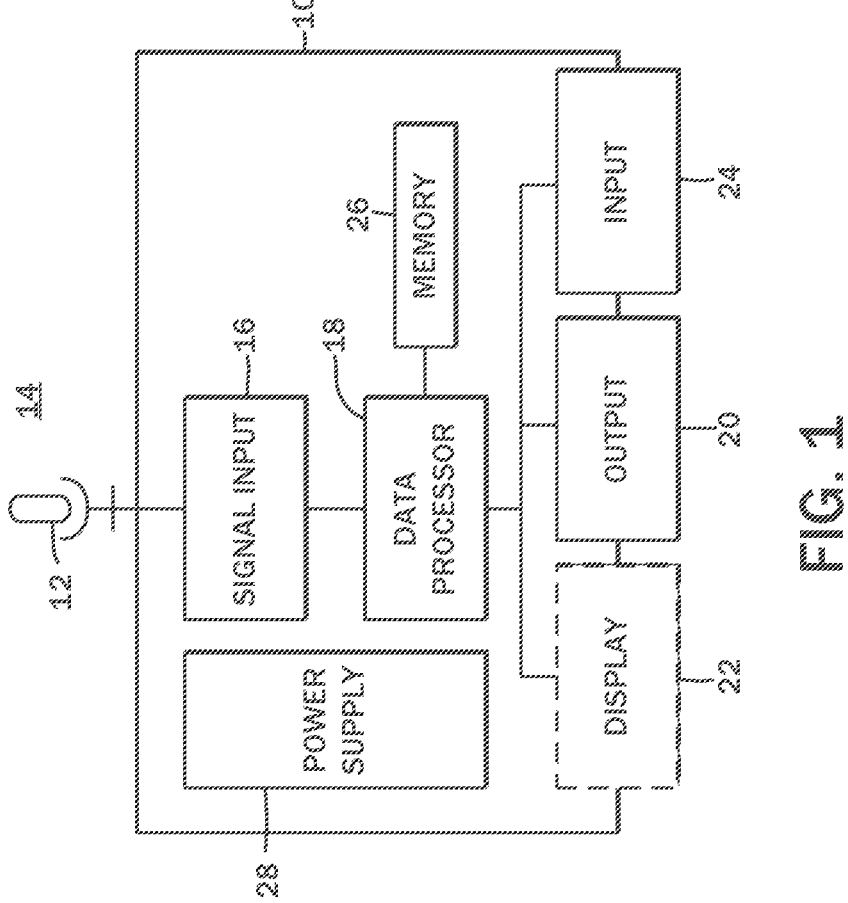
FIG. 1 is a block diagram illustrates an exemplary device with audio recognition capabilities on which embodiments of the present disclosure may be implemented.

With reference to the block diagram of FIG. 1, various embodiments of multi-stage selectable neural network suppression (MSS-NNS) may be implemented in a device 10. By way of example and not of limitation, the device 10 may be used for processing speech and performing further data processing operations in response to commands detected in the inputted audio. To this end, the device 10 may include a signal input device 12 or microphone, which captures acoustic waves propagating through a surrounding environment 14 and converts those acoustic waves to corresponding analog electronic signals or waveforms. In order to process the electronic signals, there may be a signal input processor 16. In its most basic form, the signal input processor 16 may be an analog-to-digital converter (ADC) that converts discrete voltage values of the analog signal to equivalent numeric or digitally represented numbers at set sampling intervals.

Again, the present disclosure sets forth various embodiments in the context of an audio or speech processing device 10, but other embodiments may be adapted to processing information in other forms. Thus, those having ordinary skill in the art will readily appreciate corresponding equivalents to the signal input device 12 and the signal input processor 16, to the extent such components are utilized in the context of such alternative applications.

In further detail, the device 10 includes a data processor 18 that can be programmed with instructions to execute various operations. The data processor 18 may be connected to the signal input processor 16 to receive the converted digital audio stream data from the captured audio and apply various operations thereto. As will be described more fully below, the data processor 18 may be programmed with instructions to implement one or more neural networks that can detect a class or classes of noise within the input signal, and apply filters or other operations that eliminates, reduces, minimizes, or at least attenuates noise components present in the input signal, among other functions.

Generally, the results of the operations performed by the data processor 18 may be provided to an output 20. In the context of one exemplary embodiment of a voice-activated assistant device, the data processor 18 may be further programmed to recognize commands issued to the device 10 by a human speaker, execute those commands, obtain the results of those commands, and announce the results to the output 20. In other embodiments, the output 20 may be a display device that visually presents the results. Still further, the output 20 may connect to a secondary device, either locally or via one or more networks, to relay the results from the data processor 18 for further use by such secondary remote devices.

In some embodiments, there may specifically be a display 22, the utilization of which will be described in further detail below. Broadly, however, the display 22 generates a graphical output corresponding to the results of the operations performed by the data processor 18. Along these lines, the device 10 may include an input device 24 that accepts an external input to control the execution of the pre-programmed instructions by the data processor 18. The input device 24 may be a mechanical switch, a touch input device that is overlaid on the display 22, or any other suitable component that accepts an external input, whether provided by a human user, remotely from another source, or otherwise.

The pre-programmed instructions to implement the neural networks, and the multi-stage selectable neural network suppression of the present disclosure more generally may be stored in a memory 26. Additionally, data utilized by the neural networks may also be stored in the memory 26. The data processor 18 retrieves the instructions and the data from the memory 26 and is accordingly interconnected as shown in the block diagram.

According to one preferred, though optional embodiment, the multi-stage selectable neural network suppression of the present disclosure may be best utilized in low power devices in which it would be desirable to minimize the data processor cycles needed to operate the neural networks. To this end, the device 10 may include an on-board power supply 28, which may be a battery. The block depicted as the power supply 28 is understood to include such battery, along with other electronic circuits for charging and maintaining the battery. Other embodiments also contemplate the connection of the device 10 to an external power source, in which case the power supply 28 may encompass electronic circuitry that converts line alternating current (AC) power to lower voltage levels suitable to operate the data processor 18 and other components. In such embodiments, the advantage of reduced power consumption may be achieved with multi-stage neural network suppression, particularly where the device 10 is kept powered for extended durations.

Figures 2, 3:
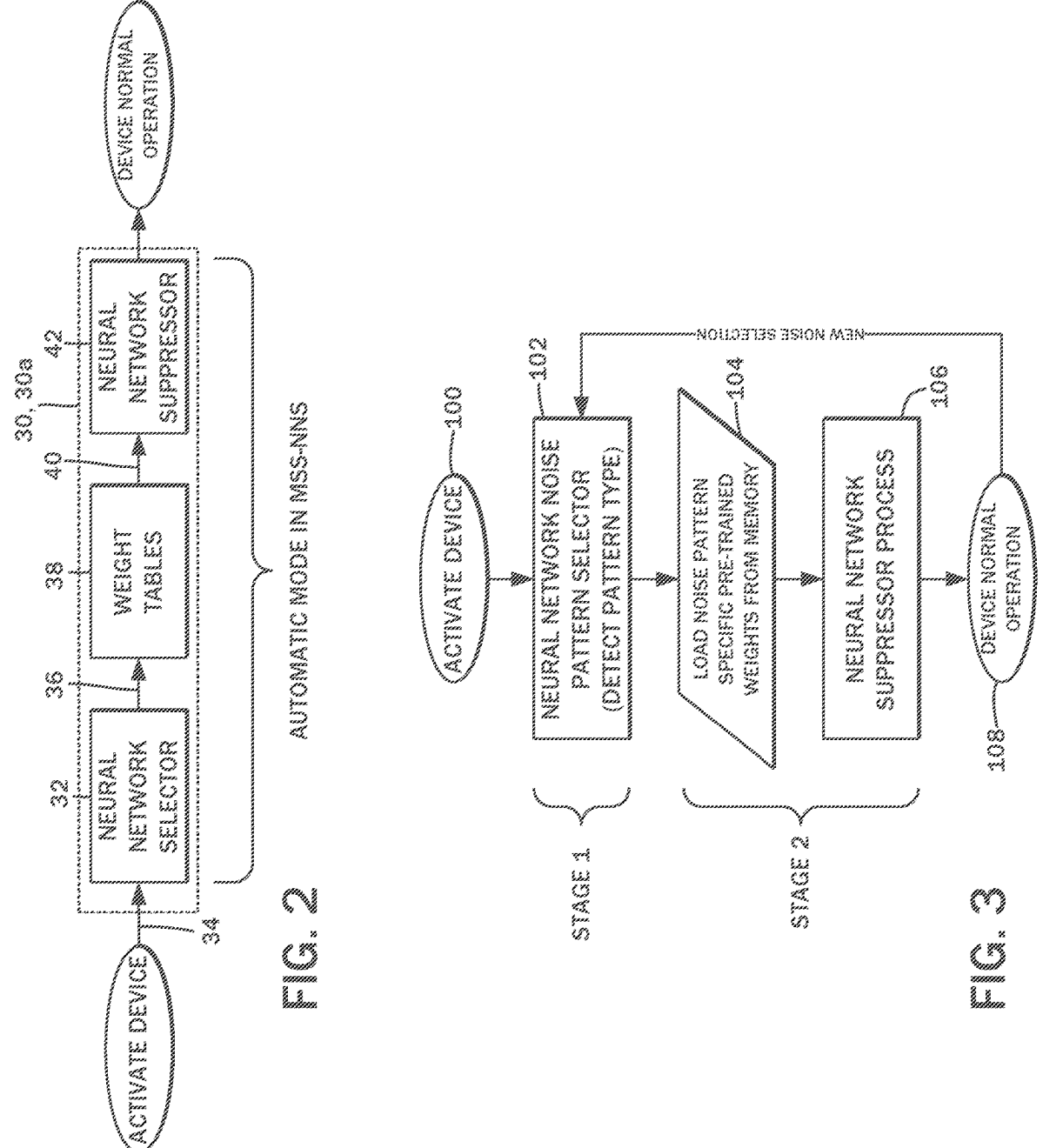
FIG. 2 is block diagram illustrating the components of a system for multi-stage selectable neural network suppression in an automatic mode operation.
FIG. 3 is a flowchart illustrating the operational steps of a method of multi-stage selectable neural network suppression in the automatic mode.

With reference to the block diagram of FIG. 2, one embodiment of the present disclosure contemplates a multi-stage selectable neural network suppression system 30 that is configured for operating in an automatic mode. In this configuration, the system 30a is defined by two smaller neural networks that work in conjunction with each other, e.g., cascading from one to the other, to perform noise suppression.

Specifically, there is a first stage noise pattern selection neural network 32 that is receptive to an input signal 34 and is configured to determine the profile of the noise that is to be suppressed. This first neural network is understood to be trained to detect the general type or pattern of noise that is to be suppressed, and as an output, generates an automatic noise classification 36 as a result of the processing of the input signal 34. By way of example, one automatic noise classification 36 may be associated with a barking dog sound, and another may be associated with a keyboard clacking noise, while still another may be associated with the hum of a running lawn mower, and the like. Those having ordinary skill in the art will recognize that such a pattern selection neural network 32 may be configured in accordance with any number of known models and types, and trained in accordance with any number of known modalities. The embodiments of the present disclosure are not to be limited to any specific implementation of neural networks, and those having ordinary skill in the art will recognize the suitable modifications to be made to adapt such alternative configurations to the system 30. One preferred embodiment is RNN (Recurrent Neural Networks) based architecture such as LSTM (Long-short term Memory) or GRU (Gated Recurrent Unit).

A given automatic noise classification 36 may be correlated to a set of one or more automatic noise suppression weight values 40 that are stored in a noise suppression weight table 38. The automatic noise suppression weight values 40 are understood to be pre-trained and associated with a predetermined noise classification. These sets of weight values are then provided to the second neural network, that is, a second stage noise pattern suppression neural network 42 that performs the targeted noise suppression as selected or designated by the first stage noise pattern selection neural network 32. This second neural network 42 reduces the noise components in the input signal 34 based upon the set of automatic noise suppression weight values 40 that were selected by the first neural network, e.g., the first stage noise pattern selection neural network 32. Like the first neural network 32, the second neural network 42 may be configured in accordance with any number of known models and types, and trained in accordance with any number of known modalities.

Referring now to the flowchart of FIG. 3, one exemplary method for a multi-stage selectable neural network suppression begins with a step 100 of activating the device 10 and receiving the input signal 34 from a signal source. As described above, the signal source may be a human speaker, the corresponding audio of the speech being transduced to an electrical signal over the microphone or signal input device 12 and digitized by the signal input processor 16. In a stage one, according to a step 102, the first stage noise pattern selection neural network 32 detects a noise pattern type, referred to more generally above as the automatic noise classification 36. Next, in a step 104, the noise pattern-specific pre-trained weights, also referred to as the automatic noise suppression weight values 40, are loaded from the memory 26. Then, in a step 106, the second stage noise pattern suppression neural network 42 applies the specified noise suppression process on the input signal 34 based upon the automatic noise suppression weight values 40. Steps 104 and 106 are understood to be a stage two of the overall noise suppression function.

The device 10 continues to operate in step 108 so long as the detected noise pattern remains the same. However, to the extent there is a change, the method returns to the step 102 to change the automatic noise suppression weight values 40 that are being utilized by the second stage noise pattern suppression neural network 42.

Another embodiment of the present disclosure contemplates the multi-stage selectable neural network suppression system 30 that is configured for operating in a manual mode. In this configuration, the system 30b is defined by one neural network, with the user setting the parameters for noise suppression.

Figures 4, 5:
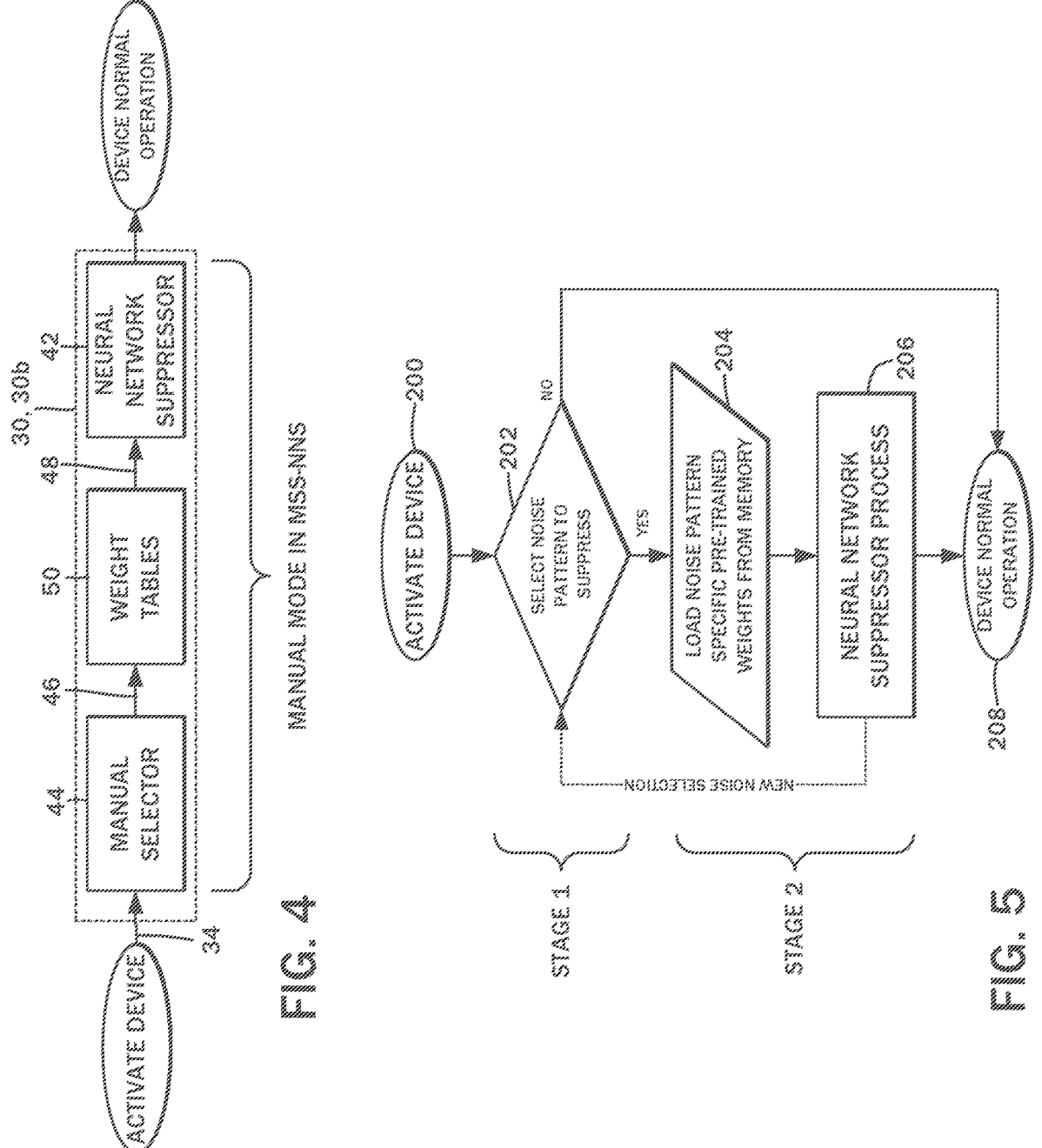
FIG. 4 is a block diagram illustrating the components of the system for multi-stage selectable neural network suppression in a manual mode operation.
FIG. 5 is a flowchart illustrating the operational steps of the method of multi-stage selectable neural network suppression in the manual mode.

Referring to the block diagram of FIG. 4, there is a manual noise suppression pattern selector 44 that is receptive to an external input of a selection of a predefined noise classification 46. In this configuration, the manual noise suppression pattern selector 44 effectively replaces the first stage noise pattern selection neural network 32. Instead of the first neural network making the decision to select the type of suppression strategy to perform, the user makes the selection. This decision can be based on the known noise conditions of the environment in which the device 10 is being deployed.

The external input to select the noise suppression pattern may be made via, for example, the input device 24. As indicated above, the input device 24 may be a mechanical switch that can be set to select one of the noise suppression patterns. Alternatively, the selection may be made via a graphical user interface that can be presented on the display 22 as a series of options in a menu. These options may provide general descriptors of the noise suppression patterns, such as "indoors," "outdoors" and the like, or more specific to dominant noises such as wind noise, background speech, offensive speech, crowded spaces with many background conversations occurring, and so on.

Sets of manual noise suppression weight values 48 may be stored in another noise suppression weight table 50 in connection with corresponding predefined noise classifications 46. The manual noise suppression weight values 48 may also be pre-trained like the automatic noise suppression weight values 40. Although a separate noise suppression weight table 50 is referenced, both the manual noise suppression weight values 48 and the automatic noise suppression weight values 40 may be stored in the same weight table as desired.

The selected set of manual noise suppression weight values 48 may then be provided to the second stage noise pattern suppression neural network 42 that performs the targeted noise suppression. This second neural network 42 reduces the noise components in the input signal 34 based upon the set of manual noise suppression weight values 48 that were selected manually via the manual noise suppression pattern selector 44.

With reference to the flowchart of FIG. 5, another exemplary method for a multi-stage selectable neural network suppression begins with a step 200 of activating the device 10 and receiving the input signal 34 from a signal source. In a stage one, according to a step 202, the predefined noise classification 46 is selected. If none is selected, then no further noise suppression is applied. Otherwise, the procedure continues to a stage 2, and specifically step 204, in which the manual noise suppression weight values 48 are loaded from the memory 26. Then, in a step 206, the second stage noise pattern suppression neural network 42 applies the specified noise suppression process on the input signal 34 based upon the manual noise suppression weight values 48.

The device 10 continues to operate in step 206/208 so long as the detected noise pattern remains the same. However, to the extent a change of the selected one of the predefined noise classifications 46, the method returns to the step 202 to change the manual noise suppression weight values 48 that are being utilized by the second stage noise pattern suppression neural network 42.

Yet another embodiment of the present disclosure contemplates the multi-stage selectable neural network suppression system 30 that is configured for operating in a hybrid automatic/manual mode. In this configuration, the system 30c is defined by two neural networks, along with the supplemental manual selection of parameters for noise suppression.

Figure 6:
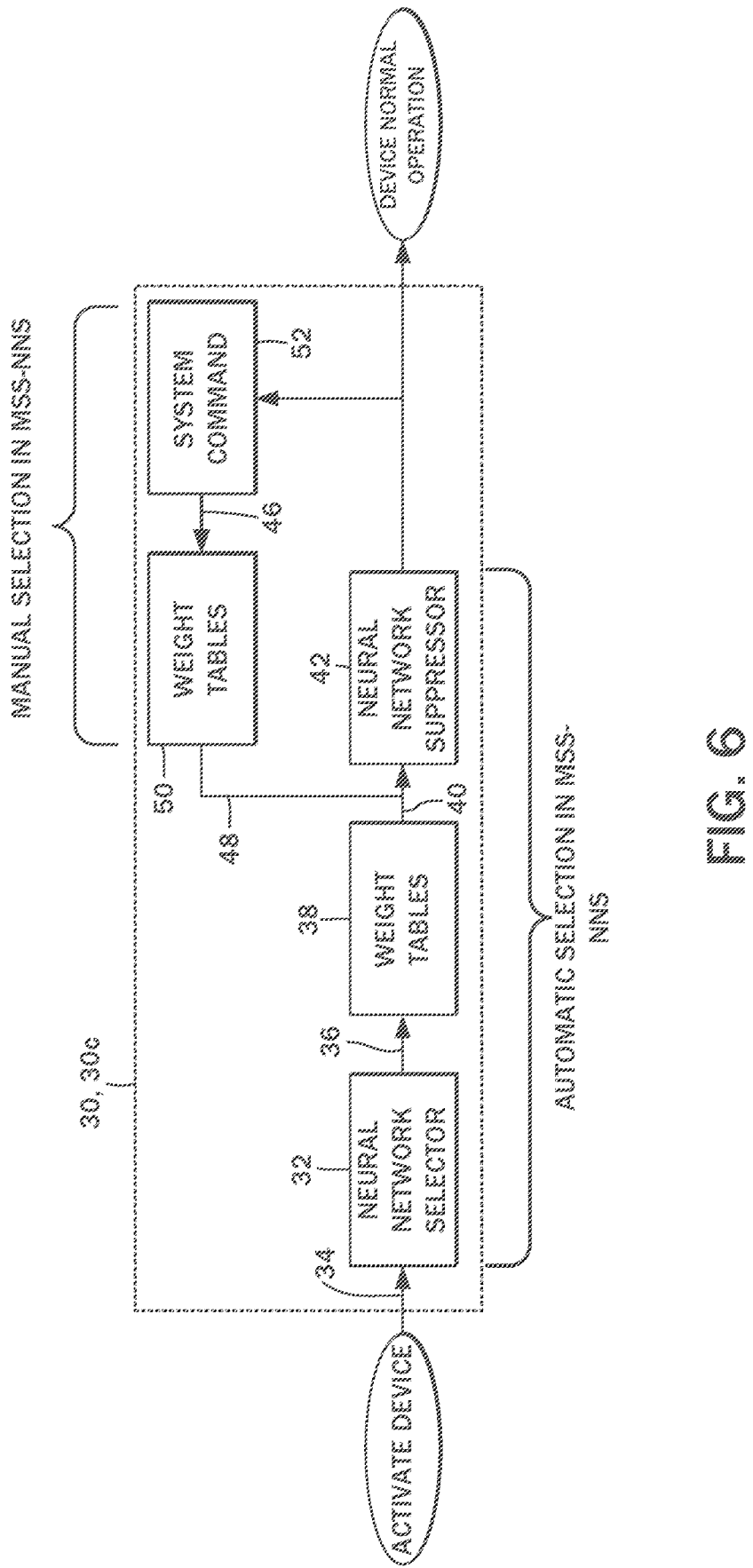
FIG. 6 is a block diagram illustrating the components of the system for multi-stage selectable neural network suppression in hybrid mode operation.

Referring to the block diagram of FIG. 6, the system includes the aforementioned first stage noise pattern selection neural network 32 that is receptive to an input signal 34 and is configured to determine the profile of the noise that is to be suppressed. This first neural network is trained to detect the general type or pattern of noise that is to be suppressed, and as an output, generates an automatic noise classification 36 as a result of the processing of the input signal 34. A given automatic noise classification 36 may be correlated to a set of one or more automatic noise suppression weight values 40 that are stored in the noise suppression weight table 38.

These sets of weight values are then provided to the second stage noise pattern suppression neural network 42 that performs at least the targeted noise suppression as selected or designated by the first stage noise pattern selection neural network 32. This second neural network 42 reduces the noise components in the input signal 34 at least partially based upon the set of automatic noise suppression weight values 40 that were selected by the first stage noise pattern selection neural network 32.

The system 30c also includes the manual noise suppression pattern selector 44 that is receptive to an external input of a selection of the predefined noise classification 46. The manual selection supplements the automatic noise suppression process, and improves upon the same based on the known noise conditions of the environment in which the device 10 is being displayed. The external input to select the noise suppression pattern may be made in the same manner as described above in the context of the manual mode. A system command 52 specifies the predefined noise classification 46, and the manual noise suppression weight values 48 stored in the noise suppression weight table 50 are retrieved. The manual noise suppression weight values 48 are combined with the aforementioned automatic noise suppression weight values 40, and provided to the second stage noise pattern suppression neural network 42. The second neural network 42 reduces the noise components in the input signal 34 based upon both the automatic noise suppression weight values 40 and the manual noise suppression weight values 48.

The supplementation of the manual noise suppression weight values 48 may be initiated at any time during normal operation. This is understood to include the manual selection of this mode of operation, as well as when another aspect of the operating conditions of the device 10 are detected by the system command 52. For example, when the device 10 is switched to operating in a "speaker mode," additional considerations of wind noise, street noise, and background conversation noise may necessitate changing the weighting of the noise suppression process. Upon detecting, or in response to such changes, the system command 52 may introduce the additional manual noise suppression weight values 48.

Figure 7:
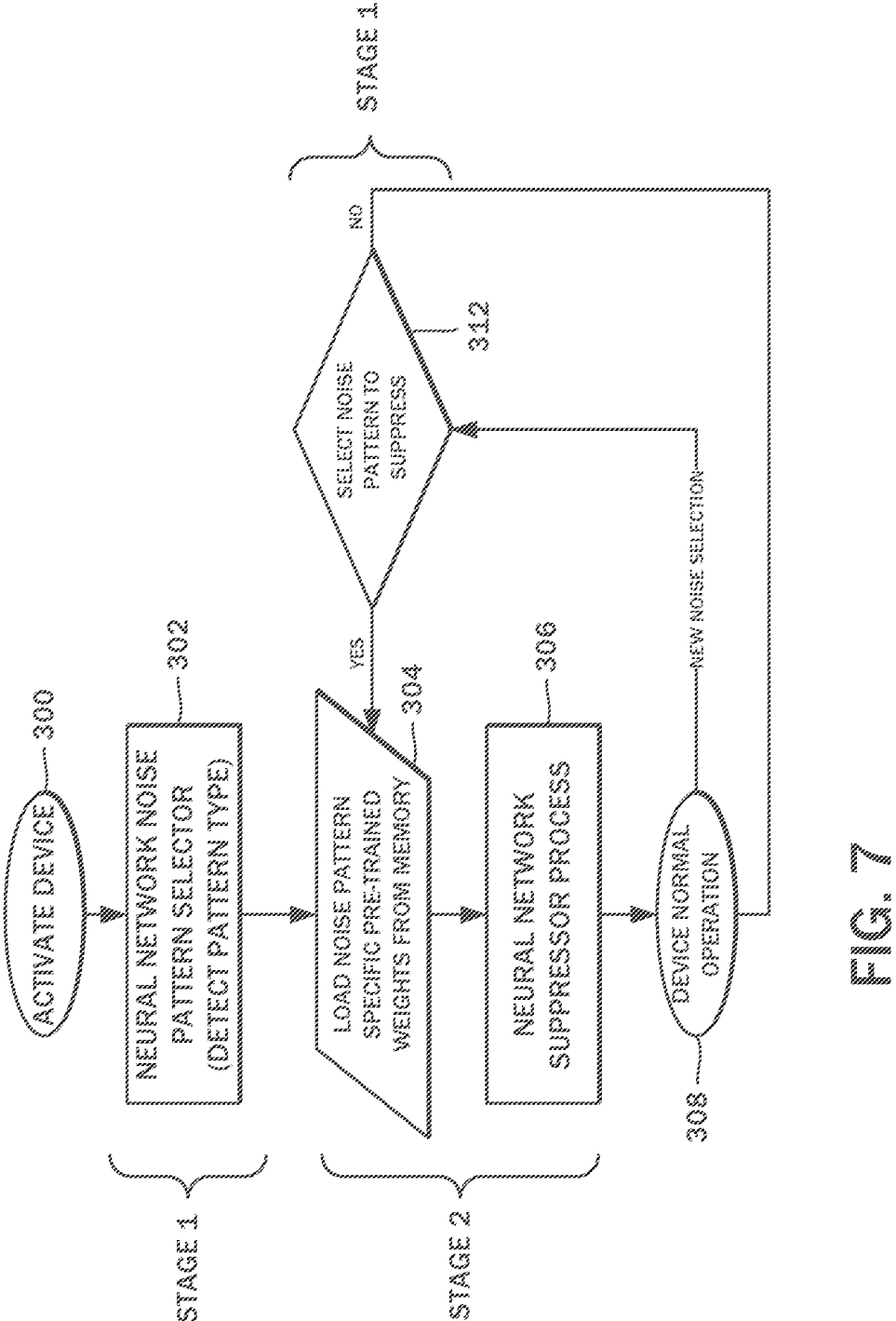
FIG. 7 is a flowchart illustrating the operational steps of a method of multi-stage selectable neural network suppression in the hybrid mode.

With reference to the flowchart of FIG. 7, an exemplary method for a multi-stage selectable neural network suppression operating in the hybrid mode begins with a step 300 of activating the device 10 and receiving the input signal 34 from a signal source. In a stage one of the automatic mode portion of operation, according to a step 302, the first stage noise pattern selection neural network 32 detects a noise pattern type or the automatic noise classification 36. Next, in a step 304, the noise pattern-specific pre-trained weights are loaded from the memory 26. The contribution from the automatic mode includes the automatic noise suppression weight values 40, while the contribution from the manual mode includes the manual noise suppression weight values 48. In order to obtain the manual noise suppression weight values 48, there may be a step 312 of selecting the noise pattern to suppress, e.g., the predefined noise classification 46, is inputted. To the extent there is no selection made, the process continues with normal operation in accordance with a step 308. This input reception/evaluation step is also understood to correspond to the stage one of the noise suppression process.

Thereafter, in a step 306, the second stage noise pattern suppression neural network 42 applies the specified noise suppression process on the input signal 34 based upon the automatic noise suppression weight values 40 and the manual noise suppression weight values 48. The device 10 continues to operate in step 308 so long as the detected noise pattern remains the same. However, to the extent there is a change, the method returns to the step 302 to change the automatic noise suppression weight values 40 that are being utilized by the second stage noise pattern suppression neural network 42. Alternatively, a new manual selection shifts the operation to step 312.

The particulars shown herein are by way of example and for purposes of illustrative discussion of the embodiments of low power, multi-stage selectable neural network suppression and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. An article of manufacture comprising a non-transitory program storage medium readable by a data processing apparatus, the medium tangibly embodying one or more programs of instructions executable by the data processing apparatus to perform a method for suppressing noise in a signal, comprising the steps of:

receiving an input signal from a signal source;

evaluating the input signal with a first stage noise pattern selection neural network, an automatic noise classification being generated from the evaluation of the input signal;

receiving an external input of a selection of one of multiple predefined noise classifications, each of the predefined noise classifications having a set of manual noise suppression weight values;

retrieving a set of automatic noise suppression weight values stored in a noise suppression weight table that correlates noise classifications to sets of noise suppression weight values, the retrieved set of the automatic noise suppression weight values corresponding to the automatic noise classification as generated by the first stage noise pattern selection neural network; and selectively applying an automatic targeted noise suppression to the input signal with a second stage noise pattern suppression neural network trained and operating independently of the first stage noise pattern selection neural network, the automatic targeted noise suppression being based upon the retrieved set of automatic noise suppression weight values.

2. The article of manufacture of claim 1, wherein the method further includes:

selectively applying either the automatic targeted noise suppression to the input signal or a manual targeted noise suppression based upon the manual noise suppression weight values corresponding to the selected one of the predefined noise classifications.

3. The article of manufacture of claim 1, wherein the method further includes:

combining selected set of automatic noise suppression weight values and the manual noise suppression weight values into a set of combined noise suppression weight values; and applying a combined targeted noise suppression to the input signal based upon the set of combined noise suppression weight values.

4. The article of manufacture of claim 1, wherein the external input is received with a mechanical switch.

5. The article of manufacture of claim 1, wherein the method further includes:

generating a graphical user interface on a display device showing a menu of options for the multiple predefined noise classifications;

wherein receiving the external input corresponds to an input provided to the graphical user interface translatable to a selection of one of the options of the displayed menu.

6. The article of manufacture of claim 1, wherein the input signal is selected from a group consisting of: an audio signal, an infrasound signal, a radio frequency signal, an electrical signal, and an image stream.

7. A multi-stage selectable neural network noise suppression system, comprising:

a first stage noise pattern selection neural network receptive to an input signal and an automatic noise classification being generated based upon an evaluation of the input signal by the first stage noise pattern selection neural network;

a noise suppression weight table correlating noise classifications to specific sets of automatic noise suppression weight values;

a second stage noise pattern suppression neural network trained and operating independently of the first stage noise pattern selection neural network and receptive to the input signal, a specific automatic targeted noise suppression being selectively applied to the input signal based upon a selected one of the automatic noise suppression weight values provided to the second stage noise pattern suppression neural network as retrieved from the noise suppression weight table with the automatic noise classification generated by the first stage noise pattern selection neural network; and a manual noise suppression pattern selector receptive to an external input of a selection of one of multiple predefined noise classifications each with manual noise suppression weight values;

wherein the second stage noise pattern suppression neural network selectively applies a manual targeted noise suppression based upon the manual noise suppression weight values associated with the selected one of the predefined noise classifications.

8. The multi-stage selectable neural network noise suppression system of claim 7, wherein the second stage noise pattern suppression neural network applying the automatic targeted noise suppression is supplemental to the application of the manual targeted noise suppression, the automatic noise suppression weight values corresponding to the automatic noise classification generated by the first stage noise pattern selection neural network are combined with the manual noise suppression weight values associated with the selected one of the predefined noise classifications.

9. The multi-stage selectable neural network noise suppression system of claim 7, wherein the external input is a mechanical switch.

10. The multi-stage selectable neural network noise suppression system of claim 7, further comprising a graphical user interface with a display showing a menu of selectable options for the multiple predefined noise classifications and the external input being translatable to an invocation of one of the selectable options.

11. The multi-stage selectable neural network noise suppression system of claim 7, wherein the input signal is selected from a group consisting of: an audio signal, an infrasound signal, a radio frequency signal, an electrical signal, and an image stream.

12. The multi-stage selectable neural network noise suppression system of claim 7, further comprising:

a data processor implementing the first stage noise pattern selection neural network and the second stage noise pattern suppression neural network; and a memory storing the noise suppression weight table.

13. The multi-stage selectable neural network noise suppression system of claim 12, further comprising:

an input audio transducer receptive to an audio wave, the audio wave being converted to the input signal.

14. An article of manufacture comprising a non-transitory program storage medium readable by a data processing apparatus, the medium tangibly embodying one or more programs of instructions executable by the data processing apparatus to perform a method for suppressing noise in a signal, the method comprising the steps of:

receiving an input signal from a signal source;

evaluating the input signal with a first stage noise pattern selection neural network, an automatic noise classification being generated from the evaluation of the input signal;

retrieving a set of automatic noise suppression weight values stored in a noise suppression weight table that correlates noise classifications to sets of noise suppression weight values, the retrieved set of the automatic noise suppression weight values corresponding to the automatic noise classification as generated by the first stage noise pattern selection neural network;

selectively applying an automatic targeted noise suppression to the input signal with a second stage noise pattern suppression neural network trained and operating independently of the first stage noise pattern selection neural network, the automatic targeted noise suppression being based upon the retrieved set of automatic noise suppression weight values;

detecting a noise profile change in the input signal;

evaluating the input signal with the first stage noise pattern selection neural network, a secondary automatic noise classification being generated therefrom; and updating the set of automatic noise suppression values correlated to the secondary automatic noise classification while the automatic targeted noise suppression is being applied to the input signal.

15. The article of manufacture of claim 14, wherein the method further includes:

receiving an external input of a selection of one of multiple predefined noise classifications, each of the predefined noise classifications having a set of manual noise suppression weight values.

16. The article of manufacture of claim 15, wherein the method further includes:

selectively applying either the automatic targeted noise suppression to the input signal or a manual targeted noise suppression based upon the manual noise suppression weight values corresponding to the selected one of the predefined noise classifications.

17. The article of manufacture of claim 15, wherein the method further includes:

combining selected set of automatic noise suppression weight values and the manual noise suppression weight values into a set of combined noise suppression weight values; and applying a combined targeted noise suppression to the input signal based upon the set of combined noise suppression weight values.

18. The article of manufacture of claim 15, wherein the method further includes:

generating a graphical user interface on a display device showing a menu of options for the multiple predefined noise classifications;

wherein receiving the external input corresponds to an input provided to the graphical user interface translatable to a selection of one of the options of the displayed menu.

19. The article of manufacture of claim 15, wherein the external input is received with a mechanical switch.

20. The article of manufacture of claim 14, wherein the input signal is selected from a group consisting of: an audio signal, an infrasound signal, a radio frequency signal, an electrical signal, and an image stream.

* * * * *